United States Patent
Vedal et al.

(10) Patent No.: US 12,348,277 B2
(45) Date of Patent: Jul. 1, 2025

(54) TESTING RF TRANSMITTERS AND RECEIVERS

(71) Applicant: Nordic Semiconductor ASA, Trondheim (NO)

(72) Inventors: Tor Øyvind Vedal, Trondheim (NO); Sverre Wichlund, Trondheim (NO); Stein Erik Weberg, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 40 days.

(21) Appl. No.: 18/039,361

(22) PCT Filed: Dec. 1, 2021

(86) PCT No.: PCT/EP2021/083769
§ 371 (c)(1),
(2) Date: May 30, 2023

(87) PCT Pub. No.: WO2022/117647
PCT Pub. Date: Jun. 9, 2022

(65) Prior Publication Data
US 2024/0080111 A1 Mar. 7, 2024

(30) Foreign Application Priority Data

Dec. 1, 2020 (GB) .................................... 2018930

(51) Int. Cl.
*H04B 3/46* (2015.01)
*H04B 1/403* (2015.01)
(Continued)

(52) U.S. Cl.
CPC ............. *H04B 17/17* (2015.01); *H04B 1/403* (2013.01); *H04B 17/0085* (2013.01); *H04B 17/318* (2015.01)

(58) Field of Classification Search
CPC .... H04B 17/17; H04B 1/403; H04B 17/0085; H04B 17/318; H04B 1/48
(Continued)

(56) References Cited

U.S. PATENT DOCUMENTS 4,225,969 A * 9/1980 Hong ........................ H04J 1/16
455/67.14
7,130,604 B1 * 10/2006 Wong ....................... H03D 7/12
455/302

(Continued)

FOREIGN PATENT DOCUMENTS

CN 103856235 * 6/2014

OTHER PUBLICATIONS

International Search Report and Written Opinion for PCT/EP2022/067992, mailed Oct. 11, 2022, 16 pages.
(Continued)

*Primary Examiner* — Helene E Tayong
(74) *Attorney, Agent, or Firm* — Klarquist Sparkman, LLP

(57) ABSTRACT

There is provided a method of testing an RF transceiver circuit and an RF transceiver circuit arranged to be operable in a test mode including a transmitter circuit portion and a receiver circuit portion, the receiver circuit portion including a mixer. The method involves the transmitter circuit portion generating a modulated signal and the receiver circuit portion receiving a continuous radio frequency wave. The mixer mixes the modulated signal with a signal derived from the continuous radio frequency wave to produce an output. A remainder of the receiver circuit portion processes the output of the mixer.

14 Claims, 5 Drawing Sheets

(51) Int. Cl.
 *H04B 17/00* (2015.01)
 *H04B 17/17* (2015.01)
 *H04B 17/318* (2015.01)

(58) Field of Classification Search
 USPC ........................................................ 375/224
 See application file for complete search history.

(56) References Cited

U.S. PATENT DOCUMENTS

| | | | | |
|---|---|---|---|---|
| 7,676,198 | B2* | 3/2010 | Mahany | H04B 1/692 |
| | | | | 370/335 |
| 9,331,797 | B2* | 5/2016 | Kordik | H04B 17/14 |
| 2004/0148580 | A1 | 7/2004 | de Obaldia et al. | |
| 2005/0085205 | A1* | 4/2005 | Behzad | H03F 3/191 |
| | | | | 455/226.1 |
| 2007/0003073 | A1* | 1/2007 | Iriarte | G10H 1/0083 |
| | | | | 381/77 |
| 2007/0146062 | A1 | 6/2007 | Otsuka et al. | |
| 2010/0177811 | A1 | 7/2010 | Duerdodt et al. | |
| 2012/0276853 | A1* | 11/2012 | De Ruijter | H04W 24/06 |
| | | | | 455/39 |
| 2013/0040592 | A1 | 2/2013 | Lee et al. | |
| 2013/0217343 | A1* | 8/2013 | Tenbroek | H04B 17/14 |
| | | | | 455/77 |
| 2014/0030988 | A1 | 1/2014 | Fu | |
| 2015/0118980 | A1 | 4/2015 | Leung et al. | |
| 2016/0174094 | A1* | 6/2016 | Waheed | H04B 1/40 |
| | | | | 455/423 |
| 2017/0149512 | A1* | 5/2017 | Einzinger | H04W 52/08 |
| 2017/0257137 | A1 | 9/2017 | Matsumura | |
| 2018/0351535 | A1 | 12/2018 | Karmaker et al. | |

OTHER PUBLICATIONS

IPO Combined Search and Examination Report under Sections 17 and 18(3) for Great Britain Application No. 2109488.3, dated Apr. 5, 2022, 10 pages.
IPO Search Report under Section 17(5) for GB2018930.4, mailed May 18, 2021, 4 pages.
International Search Report and Written Opinion for PCT/EP2021/083769, Mailed Mar. 23, 2022, 13 pages.

* cited by examiner ated embodiments may employ a simpler modulation scheme (e.g. frequency modulation). The person skilled in the art will appreciate that a constant envelope modulation scheme is one in which a peak amplitude of the output signal is constant and a modulated parameter (e.g. frequency or phase) varies. For instance, a peak amplitude of a modulated output signal at a first moment in time is equal to a peak amplitude of the modulated output signal at a second moment in time.

TESTING RF TRANSMITTERS AND RECEIVERS

CROSS REFERENCE TO RELATED APPLICATIONS

This is the U.S. National Stage of International Application No. PCT/EP2021/083769, filed Dec. 1, 2021, which was published in English under PCT Article 21(2), which in turn claims the benefit of Great Britain Application No. 2018930.4, filed Dec. 1, 2020.

BACKGROUND OF THE INVENTION

The present invention relates to testing of wireless RF transceivers.

Wireless RF transceiver modules such as those used for Bluetooth Low Energy (BLE) communications in low-power Internet-of-Things devices—e.g. in wearables or sensors—are continuously being developed to reduce hardware size and improve performance, which competes with the aim of keeping production costs low.

Small RF transceiver modules are becoming more compact and complex as innovation in the field progresses. As a result of this, faults grow more likely and robust testing of both reception and transmission functionality becomes much more important. As such, testing both the reception and transmission of data packets is necessary for ensuring the quality of such devices. In conventional transceiver tests, a dedicated external test rig is used to transmit or apply simulated data packets which are received by the antenna of the device or to receive packets which the device transmits. Such test rigs are often expensive and time-consuming to operate.

SUMMARY OF THE INVENTION

According to a first aspect the invention provides a method of testing an RF transceiver circuit comprising a transmitter circuit portion and a receiver circuit portion including a mixer;
the method comprising:
  the transmitter circuit portion generating a modulated signal;
  the receiver circuit portion receiving a continuous radio frequency wave;
  the mixer mixing the modulated signal with a signal derived from the continuous radio frequency wave to produce an output; and
  a remainder of the receiver circuit portion processing the output of the mixer.

According to a second aspect the invention provides an RF transceiver circuit arranged to be operable in a test mode and comprising:
  a transmitter circuit portion and a receiver circuit portion;
  the transmitter circuit portion arranged to generate a modulated signal;
  the receiver circuit portion arranged to receive a continuous radio frequency wave;
  the receiver circuit portion comprising a mixer arranged to mix the modulated signal with a signal derived from the continuous radio frequency wave to produce an output;
  wherein a remainder of the receiver circuit portion is arranged to process the output of the mixer.

Thus, a test signal derived from the RF continuous wave is mixed with the modulated signal at the mixer. The output of the mixer is then processed by the rest of the receiver circuit to allow this to be tested so that useful test data may be derived and stored. This may reduce what is required of the external test rig in terms of signal modulation, meaning that an external device may only be required to apply a continuous wave signal (e.g. simple sine wave) during testing. In this way, the transmitter circuit portion's modulation quality and receiver circuit portion's performance can be tested with reduced cost and complexity as sophisticated test rigs, which are often expensive, can be replaced with simpler devices. The invention may also allow testing time to be reduced—e.g. particularly in terms of set-up time as a continuous wave signal may be constantly applied without needing to send specific test packets.

In a set of embodiments, the mixer is arranged to receive the modulated signal at a local oscillator (LO) input. Therefore, an internally modulated signal may be used as an LO signal fed to the mixer of the receiver circuit portion.

Typically in loop back testing, the modulated wave appears at the antenna port, either from an externally connected antenna or via an internal connection. In contrast, the receiver circuit portion, according to a set of embodiments, receives the continuous radio frequency wave instead of a modulated wave (e.g. at an RF input of the mixer). A mixer typically comprises an RF input and an LO input. Therefore, during testing or in the test mode, there may be a continuous wave applied to an RF input of the mixer and a modulated signal applied to the LO input of the mixer.

Many radio-frequency transmitters work on the principle of Cartesian modulation (also known as Quadrature modulation) which is widely used in modern telecommunications to transmit information. Cartesian modulation works by modulating two carrier waves of the same frequency which are out of phase with each other by 90° and requires LO signals which are also in quadrature (I/Q) signals. The transmitted signal results from adding the two carrier waves together.

In a set of embodiments the RF transceiver circuit comprises an oscillator which generates a reference signal and provides the reference signal to a synthesiser, and said synthesiser generates said modulated signal. Providing an internally modulated signal (e.g. an LO signal) via the synthesiser to the mixer of the receiver circuit portion in accordance with the invention may present advantages over previous arrangements. For example, Cartesian modulation which is an expensive modulation technique, both in terms of chip area and current, is not required. In Cartesian modulation, both an RF-modulated wave and a continuous wave local oscillator signal are available at the same time. Loopback testing is therefore relatively simple to achieve. However loopback testing using modulation generated within the synthesiser is not straightforward as the RF and LO signals are inherently the same and so cannot be mixed to provide an intermediate frequency. The inventors have appreciated however that such an approach may be enabled by using the method of frequency modulating the LO signal in a constant envelope scheme in accordance with embodiments of the invention. Therefore, having a modulated LO input at the mixer may help to reduce the chip area needed and power consumption of the transceiver. This helps to produce transceivers that are well-suited for Internet of Things (IoT) devices—e.g. Bluetooth Low Energy (BLE) transceivers—where low power consumption and long battery life is particularly important.

Compared to expensive Cartesian modulation schemes which use complicated modulation schemes, amplitude modulation (AM) or phase modulation (PM), such embodiments of the invention may use frequency modulation (FM) within the synthesiser (or Voltage Controlled Oscillator) which is a comparatively low-cost technique.

Furthermore, no additional divider, RF attenuator, modulator or phase locked loop (PLL) may be required when the signal is internally modulated. Advantageously, during testing or in the test mode, the mixed signal output from the mixer may be identical (or substantially identical) in both frequency and frequency modulation to the mixed signal output in a normal mode. Therefore, signal strength may be quantified as well as the FM modulation quality while only using a single synthesiser with FM modulation.

In a set of embodiments, a signal converter module generates, from the reference signal, a test signal comprising a plurality of harmonics of the reference signal and at least one of the plurality of harmonics of the reference signal providing said continuous wave.

Thus the RF transceiver circuit, in accordance with such embodiments, allows the test signal which provides the continuous RF wave to be generated from the on-chip reference signal (by the signal converter module) after which it is fed to the receiver portion. This recognises that if one or more of the harmonics of the reference signal within the frequencies of interest have a high enough amplitude to be mixed with the modulated signal (LO signal) output from the synthesiser, it may obviate the need to provide any external signal at all. In other words, an internal continuous wave may be supplied as if received at the antenna and an internally modulated LO signal may be generated, without the two signals being in any direct harmonic relation. The continuous wave and modulated signal are mixed at the mixer.

Such embodiments may allow the RF transceiver to self-test and/or self-calibrate in-field, as opposed to in the laboratory. Testing in-field may help to ensure the reliability of the performance of the RF transceiver circuit. Having the ability to both send and receive a test packet may allow the testing time to be reduced.

One advantage of such embodiments is that the RF signal is created by the on-chip reference signal and so may be in phase lock with the LO signal (e.g. the modulated signal from the synthesiser). This means that the transceiver may have full timing control of signal transmission and reception which may allow a delay in the receiver circuit portion to be determined.

The arrangement set out above is novel and inventive in its own right and thus when viewed from a third aspect, the invention provides an RF transceiver circuit arranged to be operable in a test mode and comprising:
- a transmitter circuit portion;
- a receiver circuit portion comprising a mixer;
- a synthesiser arranged to provide a local oscillator signal for said transmitter and receiver circuit portions
- an oscillator arranged to provide a reference signal to said synthesiser;
- a signal converter module arranged in said test mode to generate, from the reference signal, a test signal comprising a plurality of harmonics of the reference signal;
- wherein said mixer is arranged in said test mode to mix at least one of the plurality of harmonics of the reference signal with the local oscillator signal to produce an output; and
- wherein a remainder of the receiver circuit portion is arranged to process the output of the mixer.

The reference signal may be generated in any suitable way. In a set of embodiments, however, the reference signal is generated by a crystal oscillator—e.g. a quartz oscillator.

In a preferred set of embodiments, the reference signal has a frequency between 0 MHz and 100 MHz—e.g. between 20 MHz and 70 MHz, e.g. 32 MHz.

In a set of embodiments the test signal is a square wave signal. The skilled person will appreciate that the square wave signal described herein will be a real-world square wave—e.g. having non-ideal rise and fall times and/or having a non-ideal duty cycle. The test signal (e.g. the square wave) may therefore comprise both even and odd order harmonics.

In a set of embodiments, the signal converter module generates a square wave from the reference frequency. As will be appreciated from the explanations herein, this facilitates loopback testing using modulation generated within the synthesiser.

In a set of embodiments, the signal converter module comprises a buffer. The signal converter module may be connected to or comprise a high-pass filter—e.g. to remove at least some of the plurality of harmonics of the reference signal which are not wanted. The high-pass filter may comprise a capacitor.

The RF transceiver circuit may be compatible with any suitable wireless radio communication protocol—e.g. Bluetooth™, Bluetooth™ Low Energy, ANT, Zigbee™, WiFi™ etc. In a set of preferable embodiments the RF transceiver circuit supports Bluetooth™ Low Energy (BLE). A BLE transceiver may provide the advantage of low-power consumption and increased battery life of the device using the transceiver.

The transmitter circuit typically comprises a modulator. In a set of embodiments, the modulator performs Gaussian Frequency Shift Keying (GSFK) modulation. In a set of embodiments, digital GSFK modulation is performed (i.e. having the modulator in the digital-domain). Digital GSFK modulation may provide the advantage of lower bit error rate.

Typically the transceiver circuit comprises an antenna. The receiver circuit portion and the transmitter circuit portion may share said antenna.

In a set of embodiments, both the transmitter circuit portion and the receiver circuit portion comprise a connection to the synthesiser.

In a set of embodiments, the transmitter circuit portion comprises switches which may be selectively opened or closed dependent on the selection of a mode—e.g. transmit mode, receive mode, loop back test mode, etc., in order for example selectively to connect an output of the synthesiser to the mixer.

In a set of embodiments, in receive mode the transmitter circuit portion is at least partially, preferably fully, powered down. Equally, in transmit mode the receiver circuit portion may be at least partially, preferably fully powered down.

The transmitter circuit portion typically comprises at least one or more of the following: a modulator; a digital-to analogue-converter (DAC) and a power amplifier (PA).

In a set of embodiments, wherein the transmitter circuit portion comprises a transmit Media Access Control (MAC) chain connected to a Direct Memory Access (DMA) controller. The transmit MAC chain may fetch data, e.g. BLE packet content, via the DMA controller from memory—e.g. RAM for use in the test mode.

The skilled person will appreciate that media access control is necessary for transceivers which have shared resources. Typically when a receiver path is active the transmitter path must be disabled and vice versa. In a set of embodiments, the receive MAC chain and transmit MAC chain are controlled to share access to the physical transmission medium i.e. a shared channel. The transmit MAC chain is typically responsible for packet generation. The receive MAC chain is typically responsible for decoding and error checking—e.g. cyclic redundancy checking (CRC). In a set of embodiments, the transmit MAC chain and receive MAC chain overlap such that at least some components are used both in transmit mode and receive mode.

The receive MAC chain may comprise a connection to a or the Direct Memory Access (DMA) controller. The receive MAC chain may therefore write data retrieved from the signal received at the receiver circuit portion to memory— e.g. RAM— via the DMA controller. In a set of embodiments, the receiver circuit portion comprises a demodulator arranged to write test data to a memory, e.g. via the DMA controller, during said test mode. In a set of embodiments, said test data from the demodulator bypasses the receive MAC chain. This may have the advantage of allowing simultaneous operation of parts of the receiver circuit whilst the transmit MAC chain is being operated.

In a set of embodiments, the RF transceiver circuit is operable in a primary test mode in which it determines a deviation, e.g. frequency deviation, of the transmitted signal from peak values, e.g. peak frequency values, measured at the demodulator. Measuring the deviation primarily may test the performance of the modulator in the transmitter circuit portion. A measured deviation may be compared to an expected deviation. The difference between the measured deviation value and expected deviation value may be compared against one or more acceptable thresholds. The primary test mode may also check that the receiver circuit portion is working properly.

In a set of embodiments, when the RF transceiver is operating in the primary test mode, the TX MAC chain transmits a digital signal comprising a selectable bit pattern. The bit pattern encoding the digital signal may be fetched by a or the DMA controller from memory—e.g. RAM. In another set of embodiments, the bit pattern is generated by a state machine inside the TX MAC chain.

The demodulator in the receiver circuit portion may determine average peak values of the modulated signal. The demodulator may write one or more of: the minimum, the maximum, and/or the average of the peak values of the modulated signal to memory. Equally, the demodulator may write all peak values of the modulated signal to memory. In a set of embodiments, the peak values of the modulated signal (e.g. minimum, maximum, and/or average values of the peak values) sent from the demodulator are used to determine the quality of the modulated signal. From these peak values/average of peak values the frequency deviation may be computed. Optionally, the demodulator may write baseband samples to memory.

Features of any aspect or embodiment described herein may, wherever appropriate, be applied to any other aspect or embodiment described herein. Where reference is made to different embodiments, it should be understood that these are not necessarily distinct but may overlap.

BRIEF DESCRIPTION OF THE DRAWINGS

One or more non-limiting examples will now be described, by way of example only, and with reference to the accompanying figures in which.

DETAILED DESCRIPTION

Figure 1:
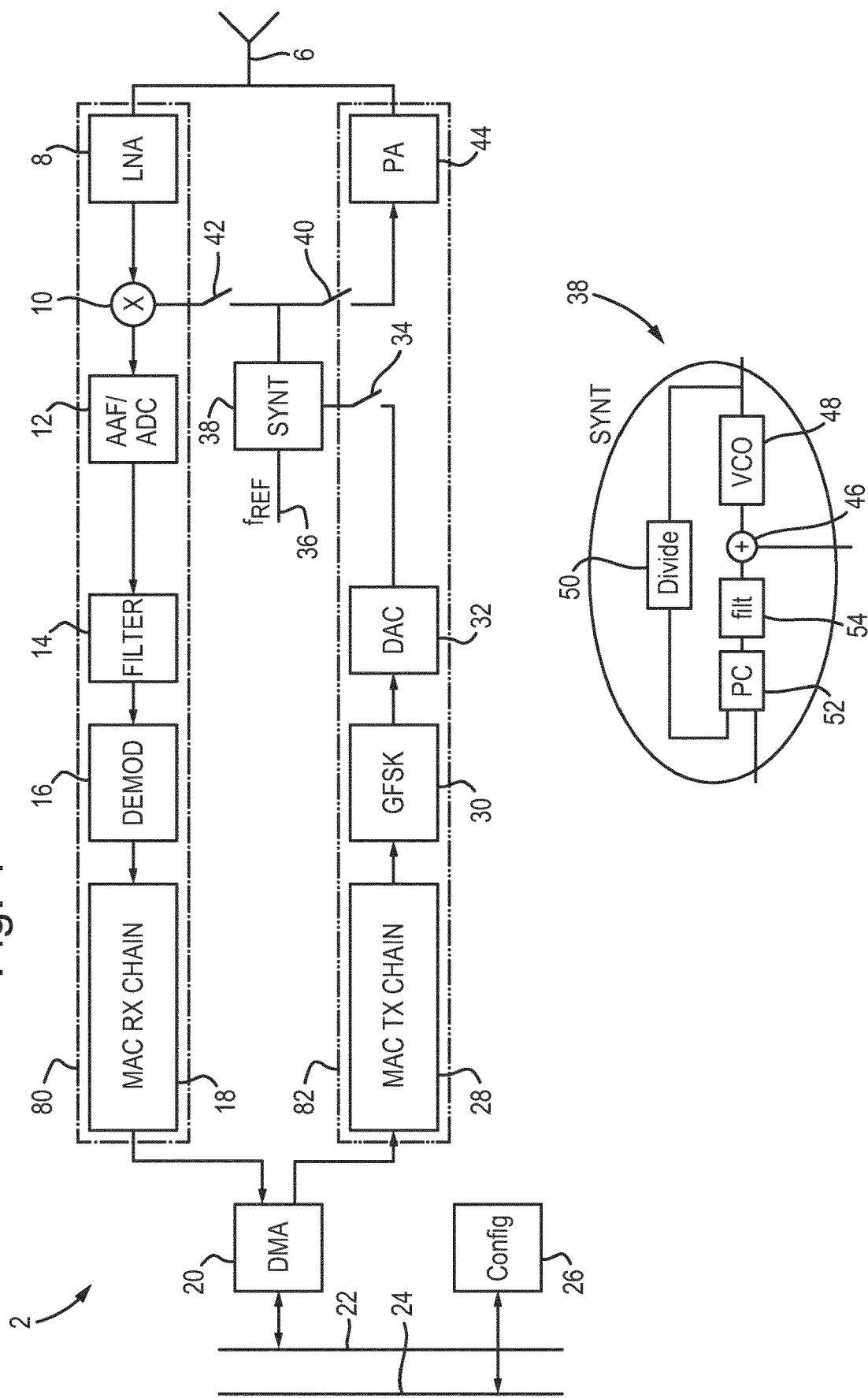
FIG. 1 schematically shows an RF transceiver architecture suitable for operating in a loop back test mode in accordance with the invention.

FIG. 1 shows an exemplary RF transceiver circuit portion 2 that is operable to provide loop back testing in accordance with the invention. In this example, the transceiver circuit portion 2 is used as a Bluetooth™ Low-Energy (BLE) transceiver suitable for Internet-of-Things (IoT) applications. The transceiver circuit portion 2 includes a receiver circuit portion 80, a transmitter circuit portion 82, a frequency synthesiser 38 and a shared antenna 6.

The receiver circuit portion 80 comprises a low noise amplifier 8 (LNA), which receives incoming signals from the antenna 6; followed by a mixer 10; an anti-aliasing filter/analogue-to-digital-converter module 12 (AAF/ADC); a filter 14; a demodulator 16; and a receive (RX) MAC chain 18.

The transmitter circuit portion comprises a transmit (TX) Media Access Control (MAC) chain 28 followed by a modulator 30—e.g. a digital Gaussian Frequency-shift keying (GFSK) modulator; a digital-to analogue-converter (DAC) 32 and a power amplifier (PA) 44 connected to the antenna 6. The DAC 32 and PA 44 are connected by the synthesiser 38.

The transmitter and receiver circuit portions 80, 82 are connected to a first bus 22 via a Direct Memory Access (DMA) controller 20. A second bus 24 is connected to a configuration module 26 for setting necessary radio parameters—e.g. synthesiser frequency, modulation type, data rate, filter set up, eventual AGC settings etc.

The transceiver circuit portion 2 has an on-chip frequency synthesiser 38 supplied with a reference signal 36. The reference signal 36 is generated by an on-chip oscillator such as a crystal-based oscillator (not shown).

A shown in the exploded detailed view, the synthesiser 38 comprises a phase locked loop (PLL) including: a phase comparator 52 for comparing the reference signal 36 with the feedback signal; a low-pass filter 54; a mixer 46 for mixing the modulated signal from the transmitter circuit portion 82 with the PLL; a voltage controlled oscillator (VCO) 48; and a feedback divider 50.

The transmitter circuit portion 82 is connected to the synthesiser via a switch 34. The synthesiser 38 is connected to the mixer 10 in the receiver circuit portion 80 via a further switch 42 and the power amplifier 44 in the transmitter circuit portion 82 via another switch 40. In FIG. 1 all switches 34, 40, 42 are open for illustrative purposes, however, they may be selectively closed depending on a mode selection.

Figure 2:
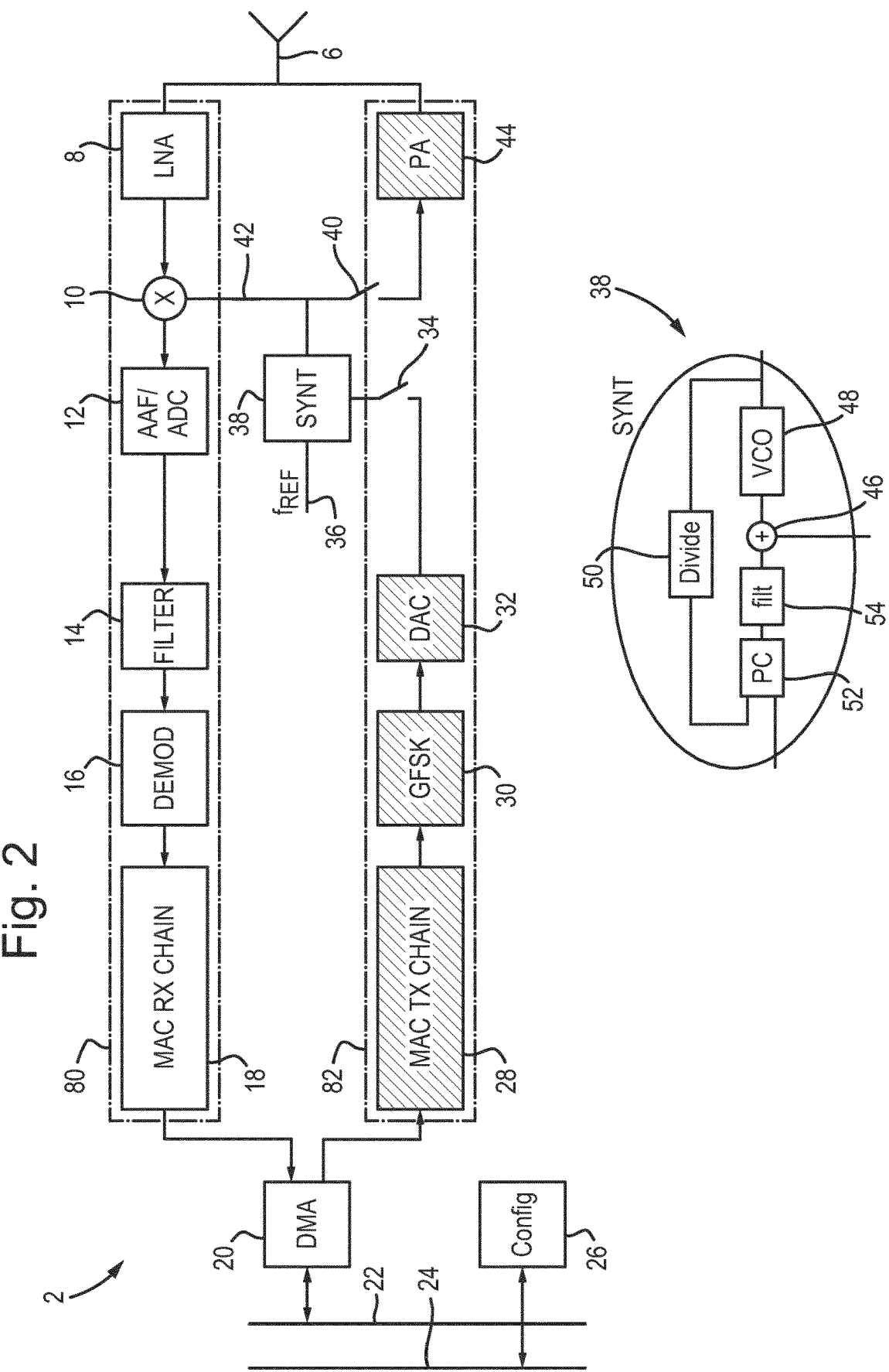
FIG. 2 schematically shows the RF transceiver of FIG. 1 in receive mode.

FIG. 2 shows the transceiver 2 of FIG. 1 in receive mode. In receive (RX) mode, the transmitter circuit portion 82 is powered down. The components that are shaded in grey— i.e. the TX MAC chain 28, modulator 30, DAC 32, and power amplifier 44—are disabled (or powered down). In this mode, the transceiver architecture 2 may operate as a typical RF receiver.

Figure 3:
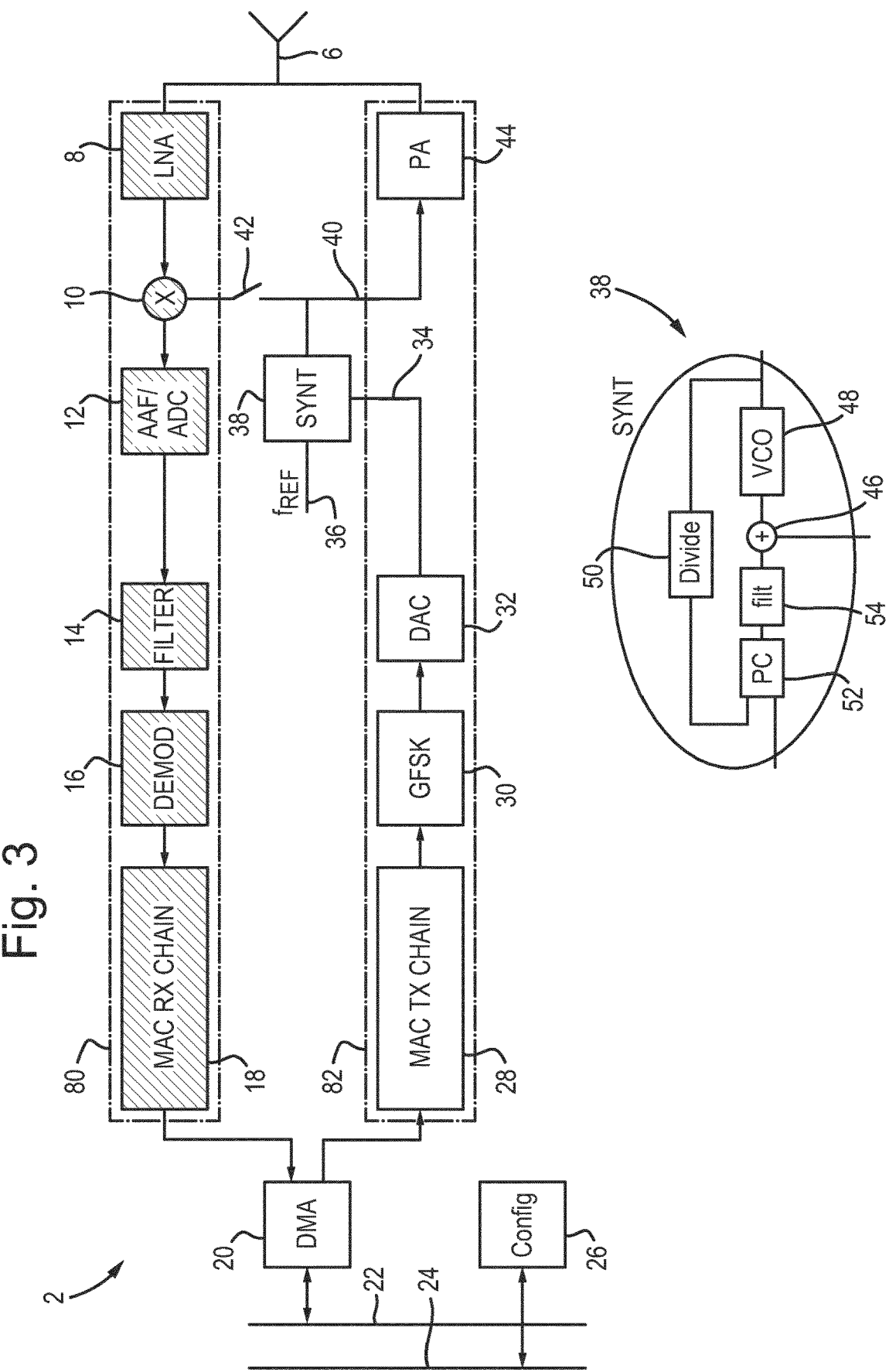
FIG. 3 schematically shows the RF transceiver of FIG. 1 in transmit mode.

FIG. 3 shows the transceiver 2 in transmit (TX) mode. In TX mode, the receiver circuit portion 80 is powered down. Similarly to FIG. 2, the components that are shaded in grey—i.e. the LNA 8, mixer 10, AAF/ADC 12, filter 14, demodulator 16, RX MAC chain 18—are disabled (or powered down). The switch 42 connecting the synthesiser 38 to the mixer is open. In this way, the transceiver architecture 2 may operate as a typical RF transmitter.

Figure 4:
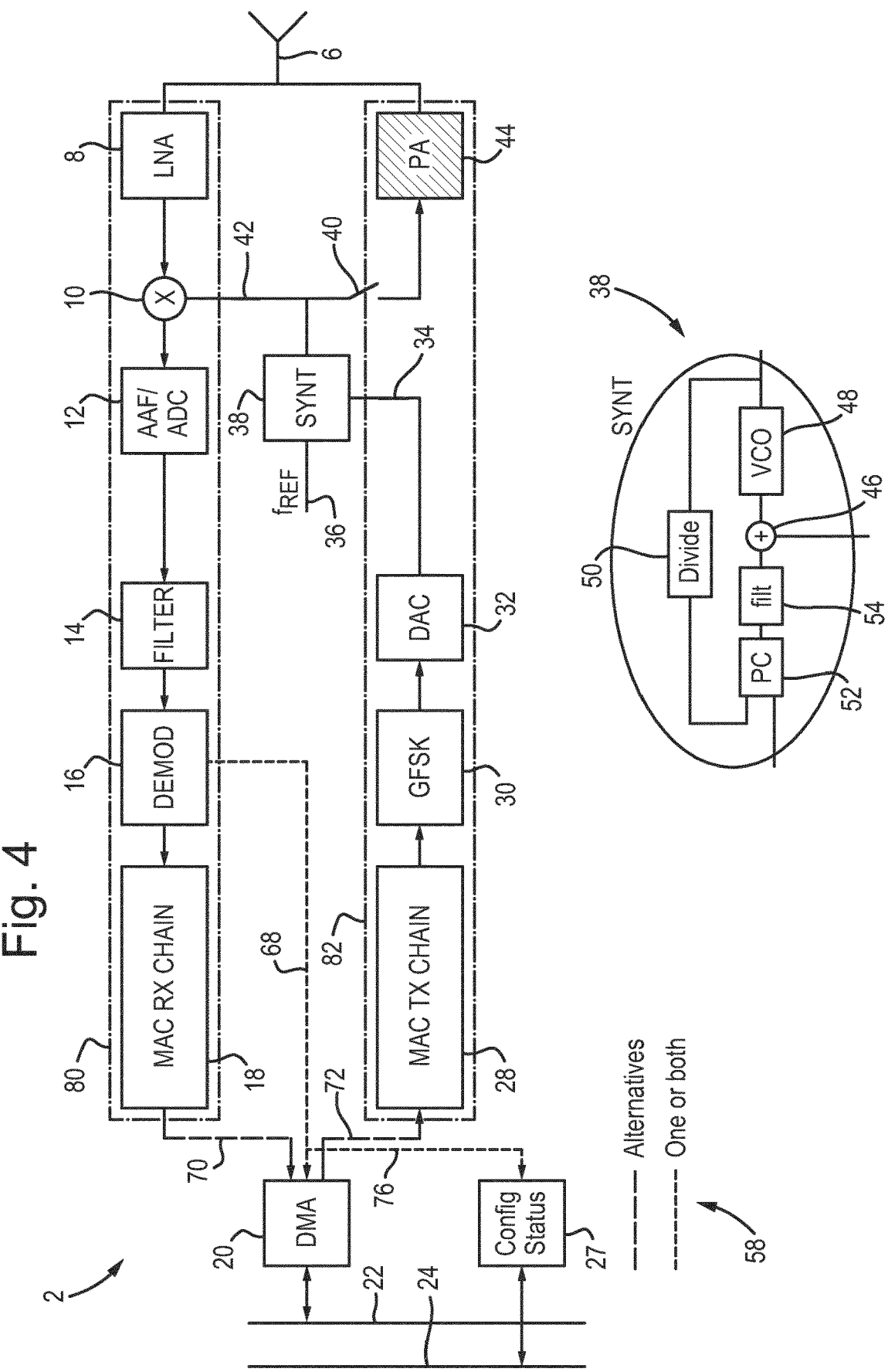
FIG. 4 schematically shows the RF transceiver of FIG. 1 operating in a test mode in accordance with the invention.

FIG. 4 shows the transceiver 2, operating in a loop back test mode in accordance with the invention. The transmitter circuit portion 82 and receiver circuit portion 80 are connected by a closed switch 42 connecting the synthesiser 38 to the mixer 10.

The switch 40 connecting the synthesiser 38 to the power amplifier 44 is opened and the power amplifier 44 is disabled or powered down. Effectively, the transceiver 2 is in RX mode with the transmission path (TX MAC chain 28, modulator 30 and DAC 32) enabled. This means that modulated signals output from the transmitter circuit portion 82, e.g. test packets, may be received and processed at the receiver circuit portion 80 (instead of being amplified and wirelessly transmitted by the antenna 6).

In FIG. 4 there is an optional additional connection 68 between the demodulator 16 and the DMA 20 and an optional additional connection 76 between the demodulator 16 and the status/configuration module 27. One or both of these connections 68, 76 may be present or operating at any one time (see key 48).

In FIG. 4, the reference signal 36 is generated by an oscillator at a frequency of 32 MHz (not shown) and is fed to the synthesiser.

The synthesiser 38 operates in a phase locked loop (PLL). The phase comparator 52 compares a feedback signal from the divider module 50 with the reference signal 36. The phase comparator 52 is followed by a filter 54 (e.g. a low pass filter), the output of which is then mixed with the modulated signal (e.g. BLE test packet) from the transmitter circuit portion at the mixer 46. The mixed signal is fed to the Voltage Controlled Oscillator (VCO) 48. The signal from the VCO 48 enters the PLL again through the divider 50 and is also output from the synthesiser 38. The resulting signal from the synthesiser 38 is modulated and comprises data which may be extracted by the receiver circuit portion.

The operation of the RF transceiver in a loop back test mode will now be described with reference to FIG. 4.

The TX MAC chain 28 fetches a BLE test packet 72 via the DMA 20 for reception by the receiver circuit portion. This is turned into a modulation signal by the modulator 30 and converted to analogue by the DAC 32 for driving the synthesiser 38 since the switch 34 thereto is closed.

In the loop back test mode shown in FIG. 4, the switch 42 connecting the synthesiser 38 and the mixer 10 is also closed. Therefore, the modulated signal is fed from the synthesiser 38 to the mixer 10 (as an LO signal), where it is mixed with a continuous wave RF signal (the test signal). This is produced by an external test rig (not shown) and received at the antenna 6. Preferably, the continuous wave RF signal and the modulated signal are one intermediate frequency (e.g. 1 MHz) apart.

The architecture shown in FIG. 4 allows a loop back test mode to be operated where the modulation of the test signal is performed on-chip by the transmitter circuit portion. Thus the arrangement shown in FIG. 4 only requires a continuous signal at the antenna 6 rather than a modulated one. This reduces the requirements of signal generation performed by external test rigs, which can be expensive.

By only requiring an external continuous wave input, reception (RX) testing may be easily performed by varying the signal strength of the external continuous wave within the signal generator set up.

Furthermore, adding the possibility to run both MACs 18, 28 concurrently may allow an RX test on all or at least the majority of channels (at least during ramp-up). This may potentially provide a more thorough test. Since there are many resources shared between the TX MAC chain 18 and the RX MAC chain 28, a test mode in the TX MAC chain 28 may bypass the usual packet formatting to allow both MACs to run concurrently. For example, reading the entire bit-stream (including header and CRC) from RAM may not be necessary. Instead a simple binary signal may be generated from the TX MAC chain 28.

In one test mode, the TX MAC chain 28 produces a binary signal having a steady pattern (e.g. 01010101 . . . or 0000111100001111 . . . ) with no whitening, no encryption and no formatting. The pattern is selectable and may be found in RAM and fetched by the DMA 20 or generated by a state machine inside the chain 28.

During the test the RX MAC chain 18 is not used. The demodulator 16 extracts test data from the signal derived from the modulated signal received at the mixer 10 and passed through the AAF/ADC 12 and further filter 14. The demodulator 16 writes data directly to the memory via the connection 68 and DMA 20, bypassing the RX MAC chain 18. As discussed above, the RX MAC chain and the TX MAC chain share resources, therefore, bypassing the RX MAC chain 18 helps both the transmitter circuit portion 82 and the receiver circuit portion 80 to operate concurrently.

Several modes are possible for routing data from the demodulator 16. In a first example, all the peak values of the modulated signal are averaged to a register—e.g. a PAR register (e.g. which starts and stops by task). In a second example, the demodulator 16 writes all peak values of the modulated signal to the memory (e.g. with 1 sample per bit).

From the data output by the demodulator 16, the quality of the modulated signal may be determined by the processor.

There is also the option to write baseband samples to the RAM via the DMA 20. However, this particular option may only be suitable for laboratory testing, as this analysis may be too slow for production.

Figure 5:
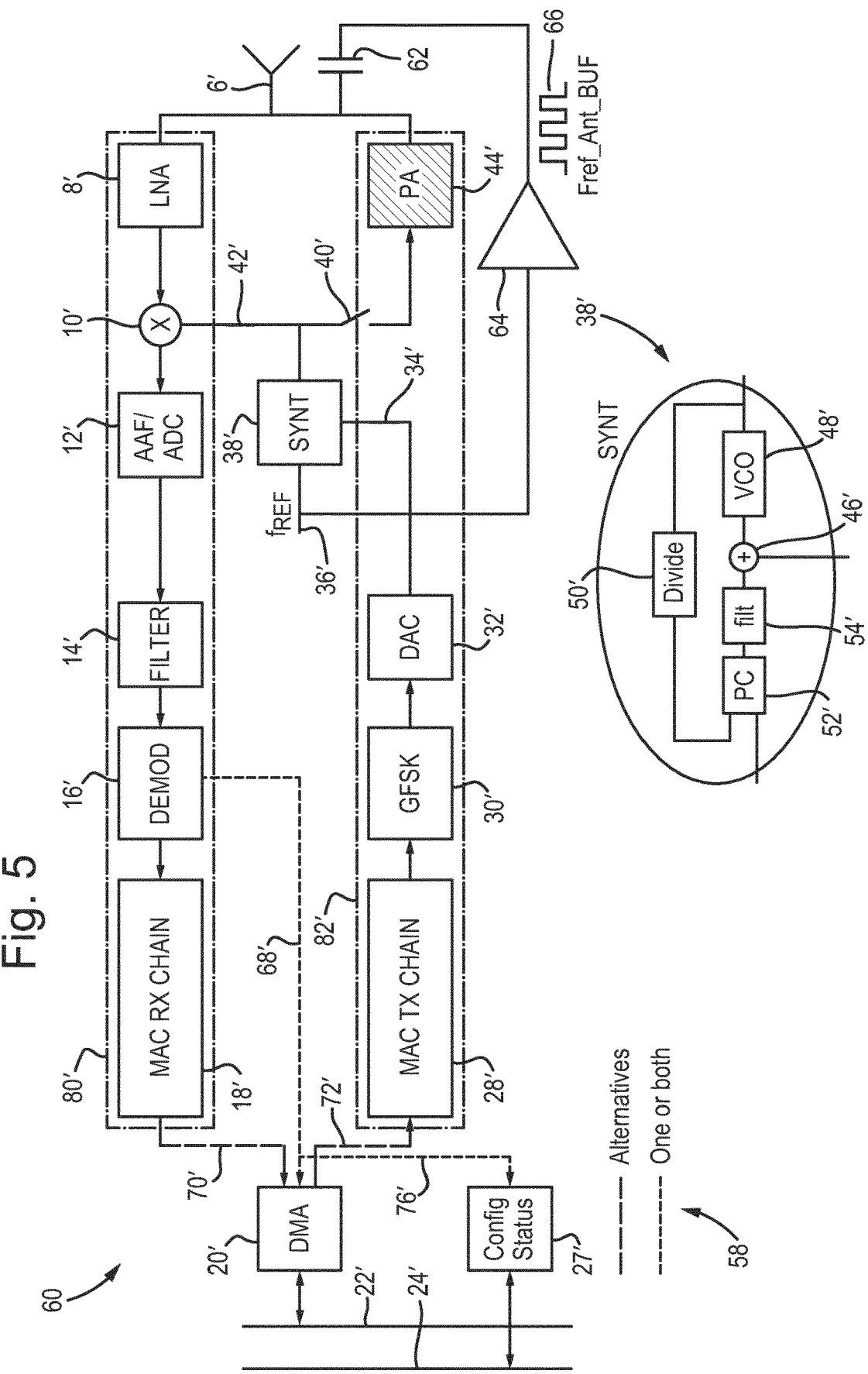
FIG. 5 schematically shows an RF transceiver according to another embodiment of the invention.

FIG. 5 shows another embodiment of the invention. The transceiver 60 of FIG. 5 is similar to that shown in earlier Figs. with like components designated by reference numerals having a prime suffix but further comprises an additional circuit portion for injecting a signal, derived from the reference signal 36', near the antenna 6'. This allows a loop back test to be carried out entirely on-chip—i.e. without the need for an external continuous wave signal to be generated.

In FIG. 5 additional circuit portion is implemented as a buffer 64 and capacitor 62 in series, the buffer 64 receiving the reference signal 36' from the oscillator (not shown) to generate a test signal from the reference signal 36'.

The operation of a self-test using an on-chip reference signal as the continuous wave signal will now be described with reference to FIG. 5.

The reference signal 36' is routed through a buffer 64 which is connected near the antenna 6' via a capacitor 62. The buffer 64 generates an approximate square wave 66 from the reference signal 36'. In some embodiments a small inverter or GPIO pad toggling could be used to generate the square wave.

The resulting square wave 66 is composed of the fundamental sine wave (at the reference frequency) and a wide range of harmonics which are integer multiples of the reference frequency. The capacitor 62 acts as a high-pass filter so that for example at least the $75^{th}$, $76^{th}$ and $77^{th}$ harmonics of the reference frequency 36' pass through and lower frequencies are filtered out or attenuated by the capacitor 62. The harmonics provide the continuous wave signal which would otherwise be supplied by the external tester device/signal generator (as in FIG. 4). If the reference frequency is at 32 MHz, then the $76^{th}$ harmonic of the square wave, will reach 2432 MHz—i.e. a sufficient frequency level to be used as an RF signal.

The skilled person will appreciate that it is physically impossible to achieve a perfect square wave. Therefore, the square wave described herein may be extended to any substantially square wave (e.g. having a non-instantaneous rise-time and fall-time and a non-ideal duty cycle). As such the "real world" square wave generated by the buffer 64 comprises both even and odd integer harmonics.

In the self-test mode, the transceiver 60 shown in FIG. 5 thus generates both an RF signal (e.g. 2432 MHz) close to the antenna 6' and a modulated LO signal (e.g. 2431 MHz) at the mixer 10' which are one intermediate frequency (1 MHz) apart without needing to use two frequency generators.

The transceiver of FIG. 5 removes the need to apply an external continuous wave signal, as the RF test signal is generated and modulated on-chip. Furthermore, even the antenna 6' is not necessary during the self-test using the architecture of FIG. 5 as no wireless reception is necessary. Using the present invention, the transceiver 60 may be used for in-field self-calibration.

The embodiment shown in FIG. 5 has the advantage that the timing of packet transmission is fully controlled internally. Therefore, during trimming, each change of trim setting does not need to invoke external measurements. This allows for faster trimming. Furthermore, many alternative modulation modes can be tested without any setup of an external signal generator. RX and TX paths may be tested both at same time.

Therefore, the invention provides an improved RF transceiver with built in test support. The invention allows the modulation of the signal to be tested as well as the functionality of the complete receiver chain. In both embodiments, there is no requirement for an external tester to provide a modulated RF test signal. In some sets of embodiments, there is no need at all for an external tester device. This has the potential to reduce the time spent setting up transceiver tests and to reduce the cost of testing.

The transceiver architectures 2, 60 shown in FIG. 4 and FIG. 5 may provide other advantages. For example, when using the transceiver circuit of FIG. 5, because there is complete timing control the delay in the receiver chain may be determined.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of testing a Radio Frequency (RF) transceiver circuit comprising a transmitter circuit portion and a receiver circuit portion including a mixer, a synthesizer, an oscillator, and a signal converter module; the method comprising:

the oscillator providing a reference signal to the synthesizer;

the synthesizer providing a local oscillator signal to the transmitter and receiver circuit portions;

the signal converter module generating, from the reference signal, a test signal comprising a plurality of harmonics of the reference signal;

the mixer mixing at least one of the plurality of harmonics of the reference signal with the local oscillator signal to produce an output; and a remainder of the receiver circuit portion processing the output of the mixer.

2. The method of claim 1, wherein the test signal generated by the signal converter module is an approximate square wave signal.

3. The method of claim 1, wherein the signal converter module comprises a buffer.

4. The method of claim 1, wherein the transmitter circuit portion comprises a transmit media access control chain connected to a direct memory access controller, the method comprising the transmit media access control chain fetching data, via the direct memory access controller, from a memory.

5. The method of claim 1, wherein the receiver circuit portion comprises a receive media access control chain having a connection to a or the direct memory access controller, the method comprising the receive media access control chain writing data retrieved from the signal received at the receiver circuit portion to memory via the direct memory access controller.

6. The method of claim 1, wherein the receiver circuit portion comprises a demodulator, the method comprising the demodulator writing test data to a memory during a test mode.

7. The method of claim 6, comprising said test data from the demodulator bypassing the receive media access control chain.

8. The method of claim 6, comprising the demodulator writing one or more of: a minimum, a maximum, and/or an average of peak values of a modulated signal to the memory.

9. The method of claim 1, comprising operating the RF transceiver circuit in a primary test mode, comprising determining a deviation of a transmitted signal from peak values measured at a demodulator.

10. A Radio Frequency (RF) transceiver circuit arranged to be operable in a test mode and comprising:

a transmitter circuit portion;

a receiver circuit portion comprising a mixer;

a synthesiser arranged to provide a local oscillator signal for said transmitter and receiver circuit portions;

an oscillator arranged to provide a reference signal to said synthesiser; and a signal converter module arranged in said test mode to generate, from the reference signal, a test signal comprising a plurality of harmonics of the reference signal;

wherein said mixer is arranged in said test mode to mix at least one of the plurality of harmonics of the reference signal with the local oscillator signal to produce an output; and wherein a remainder of the receiver circuit portion is arranged to process the output of the mixer.

11. The RF transceiver circuit of claim 10, wherein the signal converter module comprises a buffer.

12. The RF transceiver circuit of claim 10, wherein the signal converter module comprises or is connected to a high-pass filter.

13. The RF transceiver circuit of claim 10, wherein the RF transceiver circuit supports Bluetooth™ Low Energy (BLE).

14. The RF transceiver circuit of claim 10, comprising a transmit media access control chain and a receive media access control chain which overlap such that at least some components are used both in transmit mode and receive mode.

* * * * *